United States Patent
Efrati et al.

(10) Patent No.: US 9,451,507 B2
(45) Date of Patent: *Sep. 20, 2016

(54) SYSTEMS AND METHODS FOR HANDOFF OF A MOBILE TELEPHONE CALL IN A VOIP ENVIRONMENT

(75) Inventors: Tzahi Efrati, Givataim (IL); Baruch Sterman, Efrat (IL); Yariv Trabelsi, Jerusalem (IL)

(73) Assignee: VONAGE AMERICA INC., Holmdel, NJ (US)

(*) Notice: Subject to any disclaimer, the term of this patent is extended or adjusted under 35 U.S.C. 154(b) by 543 days.

This patent is subject to a terminal disclaimer.

(21) Appl. No.: 13/324,585

(22) Filed: Dec. 13, 2011

(65) Prior Publication Data

US 2013/0150038 A1 Jun. 13, 2013

(51) Int. Cl.
*H04W 36/00* (2009.01)

(52) U.S. Cl.
CPC ..... *H04W 36/0033* (2013.01); *H04W 36/0011* (2013.01); *H04W 36/0066* (2013.01)

(58) Field of Classification Search
CPC ............... H04W 36/0066; H04W 36/0033; H04W 36/0005; H04W 36/0011; H04W 36/0016; H04W 36/0027
USPC ............ 455/432.1, 436, 437, 439, 443, 444, 455/450, 452.1, 464; 370/328, 331–333, 370/338, 341
See application file for complete search history.

(56) References Cited

U.S. PATENT DOCUMENTS

| | | | |
|---|---|---|---|
| 6,842,449 B2 | 1/2005 | Hardjono | |
| 7,920,680 B2 | 4/2011 | Saha et al. | |
| 8,027,309 B2 | 9/2011 | Kotecha et al. | |
| 8,086,243 B2 | 12/2011 | Thermond | |
| 8,223,720 B1* | 7/2012 | Efrati et al. | 370/331 |
| 2003/0185202 A1* | 10/2003 | Maenpaa | 370/352 |
| 2007/0008931 A1* | 1/2007 | Yamamoto et al. | 370/331 |
| 2008/0310375 A1* | 12/2008 | Akram et al. | 370/338 |
| 2009/0031130 A1 | 1/2009 | Hirano et al. | |
| 2009/0161627 A1* | 6/2009 | Ekambaram et al. | 370/331 |
| 2010/0284374 A1* | 11/2010 | Evans | 370/332 |
| 2010/0309886 A1* | 12/2010 | Vikberg et al. | 370/332 |

(Continued)

FOREIGN PATENT DOCUMENTS

WO 2006/032826 3/2006

OTHER PUBLICATIONS

Office Action issued in U.S. Appl. No. 13/324,666 on Feb. 23, 2012.

(Continued)

*Primary Examiner* — Magdi Elhag
(74) *Attorney, Agent, or Firm* — Nixon & Vanderhye P.C.; Joseph Pagnotta

(57) ABSTRACT

When a mobile telephony device is conducting a voice over Internet protocol (VOIP) telephone call via a data network, and the mobile telephone device transitions from a first wireless data connection to a second wireless data connection, signaling between the mobile telephone device and a media relay inform the media relay how to address data packets bearing the media of the call after the transition has occurred. In some embodiments, the mobile telephone device establishes multiple simultaneous wireless data connections, and the mobile telephony device switches the media of the call between the wireless data connections depending on the quality of the wireless data connections.

13 Claims, 7 Drawing Sheets

(56) References Cited

U.S. PATENT DOCUMENTS

2010/0323728 A1* 12/2010 Gould et al. .................. 455/466
2011/0222423 A1* 9/2011 Spindola et al. ............. 370/252

OTHER PUBLICATIONS

Lee Y. et al., A Scalable and Practical Authentification Protocol in Mobile IP, IEICE Transactions on Communications, Communications Society, Tokyo, JP, vol. E91B, No. 2, Feb. 1, 2008, pp. 601-604, XP001511268.

Fathi H. et al., Mobility Management for VOIP: Evaluation of Mobile IP-Based Protocols, Communications, 2005, ICC 2005, 2005 IEEE International Conference on Seoul, Korea May 16-20, 2005, Piscataway, NJ, USA, IEEE, vol. 5, May 16, 2005, pp. 3230-3235, XP010825858.

Bellavista P et al., Self-Adaptive Handoff Management for Mobile Streaming Continuity, IEEE Transactions on Network and Service Management, IEEE, US, vol. 6, No. 2, Jun. 1, 2009, pp. 80-94, XP011287373.

Benslimane A., Multimedia Multicast in Mobile Computing, Multimedia Software Engineering, 2000, Proceedings, International Symposium on Taipei, Taiwan Dec. 11-13, 2000, Los Alamitos, CA, USA, IEEE Comput. Soc., US, Dec. 11, 2000, pp. 339-346, XP010528749.

Tin-Yu Wu et al., Efficient Architecture and Handoff Strategy Used for VOIP Sessions in SIP Based Wireless Networks, Wireless Personal Communications, Kluwer Academic Publishers, DO, vol. 43, No. 2, Oct. 26, 2006, pp. 201-214, XP019557938.

Tae Chul Hong et al., Adaptive Buffering Scheme for Streaming Service in Intersystem Handover Between Terrestrial and Satellite Systems, Consumer Electronics, 2008, ISCE 2008, IEEE International Symposium on, IEEE, Piscataway, NJ, USA, Apr. 14, 2008, pp. 1-4, XP031283693.

International Search Report issued in PCT/US2012/066031 on Feb. 13, 2013.

Written Opinion issued in PCT/US2012/066031 on Feb. 13, 2013.

European Search Report issued in EP Patent Appl 14177710.2 on Oct. 17, 2014.

* cited by examiner

SYSTEMS AND METHODS FOR HANDOFF OF A MOBILE TELEPHONE CALL IN A VOIP ENVIRONMENT

BACKGROUND OF THE INVENTION

The invention is related to Internet protocol (IP) telephony systems that allow users to place and receive telephone calls, and to send and receive text and video messages via data packets that are communicated over a data network.

A mobile telephony device conducts a voice over Internet protocol (VOIP) telephone call by linking itself to a data network using a wireless data connection. The wireless data connection could be a link to a wireless router that is coupled to a data network, such as a WiFi or WiMax router. Alternatively, a mobile telephony device could establish a wireless data connection to a data network over a data channel provided by a cellular telephony service provider.

If a mobile telephony device is conducting a VOIP telephone call, and the user of the mobile telephony device moves out of communication range of the wireless router or cell tower that the mobile telephony device has used to establish a wireless data connection, the call will be disconnected. However, it is also possible that the movement of the mobile telephony device will bring the mobile telephony device within communication range of a new wireless router or cell tower at the same time, or before, the mobile telephony device passes out of communication range of the first wireless router or cell tower. If this occurs, it would be desirable for the mobile telephony device to automatically establish a new wireless data connection with the new wireless router or cell tower, and for the call to continue through the new wireless data connection.

Unfortunately, it is difficult to transition a VOIP telephone call from a first wireless data connection to a second wireless data connection mid-call. During a VOIP telephone call, the mobile telephony device is sending data packets to and receiving data packets from a specific server, gateway or media relay in the data network. During call setup, the server, gateway or media relay will have been provided with the Internet protocol (IP) address and port number that data packets must be sent to in order to arrive at the mobile telephony device. Likewise, the server, gateway or media relay will expect to receive all data packets sent from the mobile telephony device from that same IP address and port number during the entire telephony session.

If the mobile telephony device transitions from a first wireless data connection to a second wireless data connection, the IP address and port number associated therewith are both likely to change. The mobile telephony device will still have the IP address and port number of the server, gateway or media relay that it has been communicating with, but it will be sending data packets bearing the media of the call to the server, gateway or media relay from its new IP address and port number. These data packets will not be recognized by the server, gateway or media relay as coming from the proper location. As a result, the data packets will be ignored. Likewise, the server, gateway or media relay will not know to re-direct data packets intended for the mobile telephony device to the new IP address and port number now being used by the mobile telephony device to continue the telephony session. For these reasons, it is difficult, or impossible, for a mobile telephony device conducting a VOIP telephone call to transition from a first wireless data connection to a second wireless data connection mid-call.

DETAILED DESCRIPTION OF PREFERRED EMBODIMENTS

The following detailed description of preferred embodiments refers to the accompanying drawings, which illustrate specific embodiments of the invention. Other embodiments having different structures and operations do not depart from the scope of the present invention.

In the following description, the terms VOIP system, VOIP telephony system, IP system and IP telephony system are all intended to refer to a system that connects callers and that delivers data, text and video communications using Internet protocol data communications.

Figure 1:
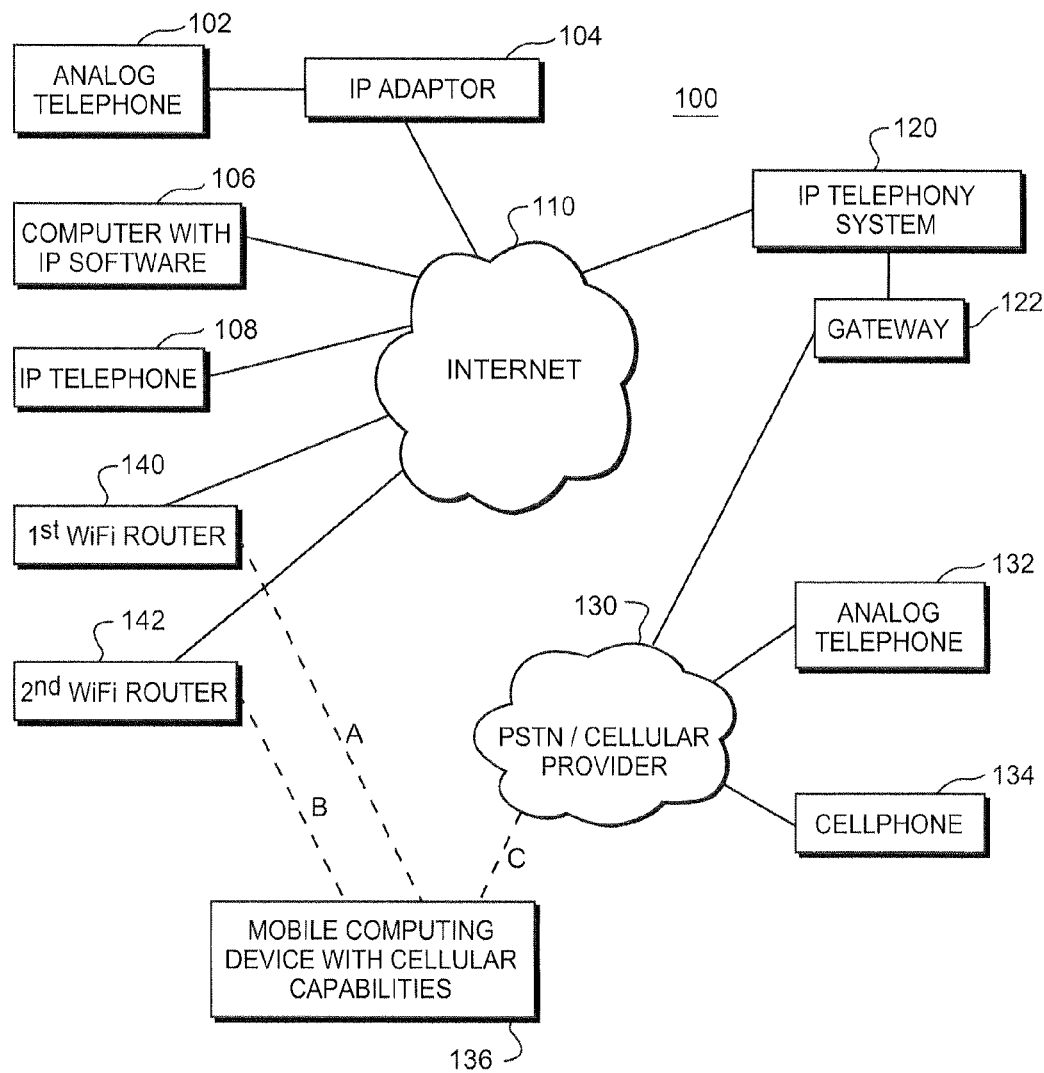
FIG. 1 is a diagram of a communications environment including various elements which are associated with an Internet protocol (IP) telephony system operating in accordance with the invention.

As illustrated in FIG. 1, a communications environment 100 is provided to facilitate IP enhanced communications. An IP telephony system 120 enables connection of telephone calls between its own customers and other parties via data communications that pass over a data network 110. The data network 110 is commonly the Internet, although the IP telephony system 120 may also make use of private data networks. The IP telephony system 120 is connected to the Internet 110. In addition, the IP telephony system 120 is connected to a publicly switched telephone network (PSTN) 130 via a gateway 122. The PSTN 130 may also be directly coupled to the Internet 110 through one of its own internal gateways (not shown). Thus, communications may pass back and forth between the IP telephony system 120 and the PSTN 130 through the Internet 110 via a gateway maintained within the PSTN 130.

The gateway 122 allows users and devices that are connected to the PSTN 130 to connect with users and devices that are reachable through the IP telephony system 120, and vice versa. In some instances, the gateway 122 would be a part of the IP telephony system 120. In other instances, the gateway 122 could be maintained by a third party.

Customers of the IP telephony system 120 can place and receive telephone calls using an IP telephone 108 that is connected to the Internet 110. Such an IP telephone 108 could be connected to an Internet service provider via a wired connection or via a wireless router. In some instances, the IP telephone 108 could utilize the data channel of a cellular telephone system to access the Internet 110.

Alternatively, a customer could utilize a analog telephone 102 which is connected to the Internet 110 via a telephone adapter 104. The telephone adapter 104 converts analog signals from the telephone 102 into data signals that pass over the Internet 110, and vice versa. Analog telephone devices include but are not limited to standard telephones and document imaging devices such as facsimile machines. A configuration using a telephone adapter 104 is common where the analog telephone 102 is located in a residence or business. Other configurations are also possible where multiple analog telephones share access through the same IP adaptor. In those situations, all analog telephones could share the same telephone number, or multiple communication lines (e.g., additional telephone numbers) may provisioned by the IP telephony system 120.

In addition, a customer could utilize a soft-phone client running on a computer 106 to place and receive IP based telephone calls, and to access other IP telephony systems (not shown). In some instances, the soft-phone client could be assigned its own telephone number. In other instances, the soft-phone client could be associated with a telephone number that is also assigned to an IP telephone 108, or to a telephone adaptor 104 that is connected one or more analog telephones 102.

Users of the IP telephony system 120 are able to access the service from virtually any location where they can connect to the Internet 110. Thus, a customer could register with an IP telephony system provider in the U.S., and that customer could then use an IP telephone 108 located in a country outside the U.S. to access the services. Likewise, the customer could also utilize a computer outside the U.S. that is running a soft-phone client to access the IP telephony system 120.

A third party using an analog telephone 132 which is connected to the PSTN 130 may call a customer of the IP telephony system 120. In this instance, the call is initially connected from the analog telephone 132 to the PSTN 130, and then from the PSTN 130, through the gateway 122 to the IP telephony system 120. The IP telephony system 120 then routes the call to the customer's IP telephony device. A third party using a cellular telephone 134 could also place a call to an IP telephony system customer, and the connection would be established in a similar manner, although the first link would involve communications between the cellular telephone 134 and a cellular telephone network. For purposes of this explanation, the cellular telephone network is considered part of the PSTN 130.

In the following description, references will be made to an "IP telephony device." This term is used to refer to any type of device which is capable of interacting with an IP telephony system to complete an audio or video telephone call or to send and receive text messages, and other forms of communications. An IP telephony device could be an IP telephone, a computer running IP telephony software, a telephone adapter which is itself connected to a normal analog telephone, or some other type of device capable of communicating via data packets. An IP telephony device could also be a cellular telephone or a portable computing device that runs a software application that enables the device to act as an IP telephone. Thus, a single device might be capable of operating as both a cellular telephone and an IP telephone.

The following description will also refer to a mobile telephony device. The term "mobile telephony device" is intended to encompass multiple different types of devices. In some instances, a mobile telephony device could be a cellular telephone. In other instances, a mobile telephony device may be a mobile computing device, such as the Apple iPhone™, that includes both cellular telephone capabilities and a wireless data transceiver that can establish a wireless data connection to a data network. Such a mobile computing device could run appropriate application software to conduct VOIP telephone calls via a wireless data connection. Thus, a mobile computing device, such as an Apple iPhone™, a RIM Blackberry or a comparable device running Google's Android operating system could be a mobile telephony device.

In still other instances, a mobile telephony device may be a device that is not traditionally used as a telephony device, but which includes a wireless data transceiver that can establish a wireless data connection to a data network. Examples of such devices include the Apple iPod Touch™ and the iPad™. Such a device may act as a mobile telephony device once it is configured with appropriate application software.

FIG. 1 illustrates that a mobile computing device with cellular capabilities 136 is capable of establishing a first wireless data connection A with a first wireless access point 140, such as a WiFI or WiMax router. The first wireless access point 140 is coupled to the Internet 110. Thus, the mobile computing device 136 can establish a VOIP telephone call with the IP telephony system 120 via a path through the Internet 110 and the first wireless access point 140.

FIG. 1 also illustrates that the mobile computing device 136 can establish a second wireless data connection B with a second wireless access point 142 that is also coupled to the Internet 110. Further, the mobile computing device 136 can establish a third wireless data connection C via a data channel provided by a cellular service provider 130 using its cellular telephone capabilities. The mobile computing device 136 could also establish a VOIP telephone call with the IP telephony system 120 via the second wireless connection B or the third wireless connection C.

Although not illustrated in FIG. 1, the mobile computing device 136 may be capable of establishing a wireless data connection to a data network, such as the Internet 110, via alternate means. For example, the mobile computing device 136 might link to some other type of wireless interface using an alternate communication protocol, such as the WiMax standard.

Figure 2:
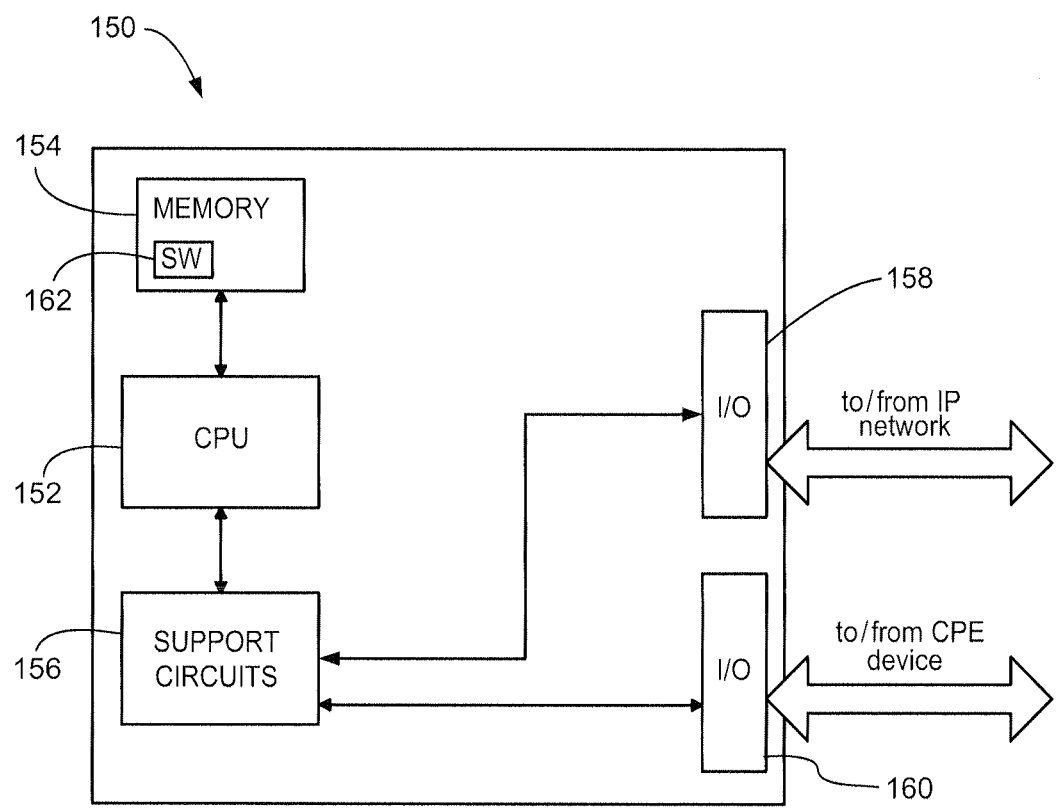
FIG. 2 is a block diagram of various elements of a processor that forms part of an IP telephony system operating in accordance with the invention.

FIG. 2 illustrates elements of a computer processor 150 that can be used as part of the IP telephony system 120 to accomplish various functions. The IP telephony system 120 could include multiple processors 150 located at various locations in the system, along with their operating components and programming, each carrying out a specific or dedicated portion of the functions performed by the VOIP based telephony service 120.

The processor 150 shown in FIG. 2 may be one of any form of a general purpose computer processor used in accessing an IP-based network, such as a corporate intranet, the Internet or the like. The processor 150 comprises a central processing unit (CPU) 152, a memory 154, and support circuits 156 for the CPU 152. The processor 150 also includes provisions 158/160 for connecting the processor 150 to customer equipment and to service provider agent equipment, as well as possibly one or more input/output devices (not shown) for accessing the processor and/or performing ancillary or administrative functions related thereto. The provisions 158/160 are shown as separate bus structures in FIG. 2; however, they may alternately be a single bus structure without degrading or otherwise changing the intended operability of the processor 150.

The memory 154 is coupled to the CPU 152. The memory 154, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 156 are coupled to the CPU 152 for supporting the processor in a conventional manner. These circuits include cache, power supplies, clock circuits, input/output circuitry and subsystems, and the like.

A software routine 162, when executed by the CPU 152, causes the processor 150 to perform processes of the disclosed embodiments, and is generally stored in the memory 154. The software routine 162 may also be stored and/or executed by a second CPU (not shown) that is remotely located from the hardware being controlled by the CPU 152. Also, the software routines could also be stored remotely from the CPU. For example, the software could be resident on servers and memory devices that are located remotely from the CPU, but which are accessible to the CPU via a data network connection.

The software routine 162, when executed by the CPU 152, transforms the general purpose computer into a specific purpose computer that performs one or more functions of the IP telephony system 120. Although the processes of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routine 162 of the disclosed embodiments is capable of being executed on any computer operating system, and is capable of being performed using any CPU architecture.

Figure 3:
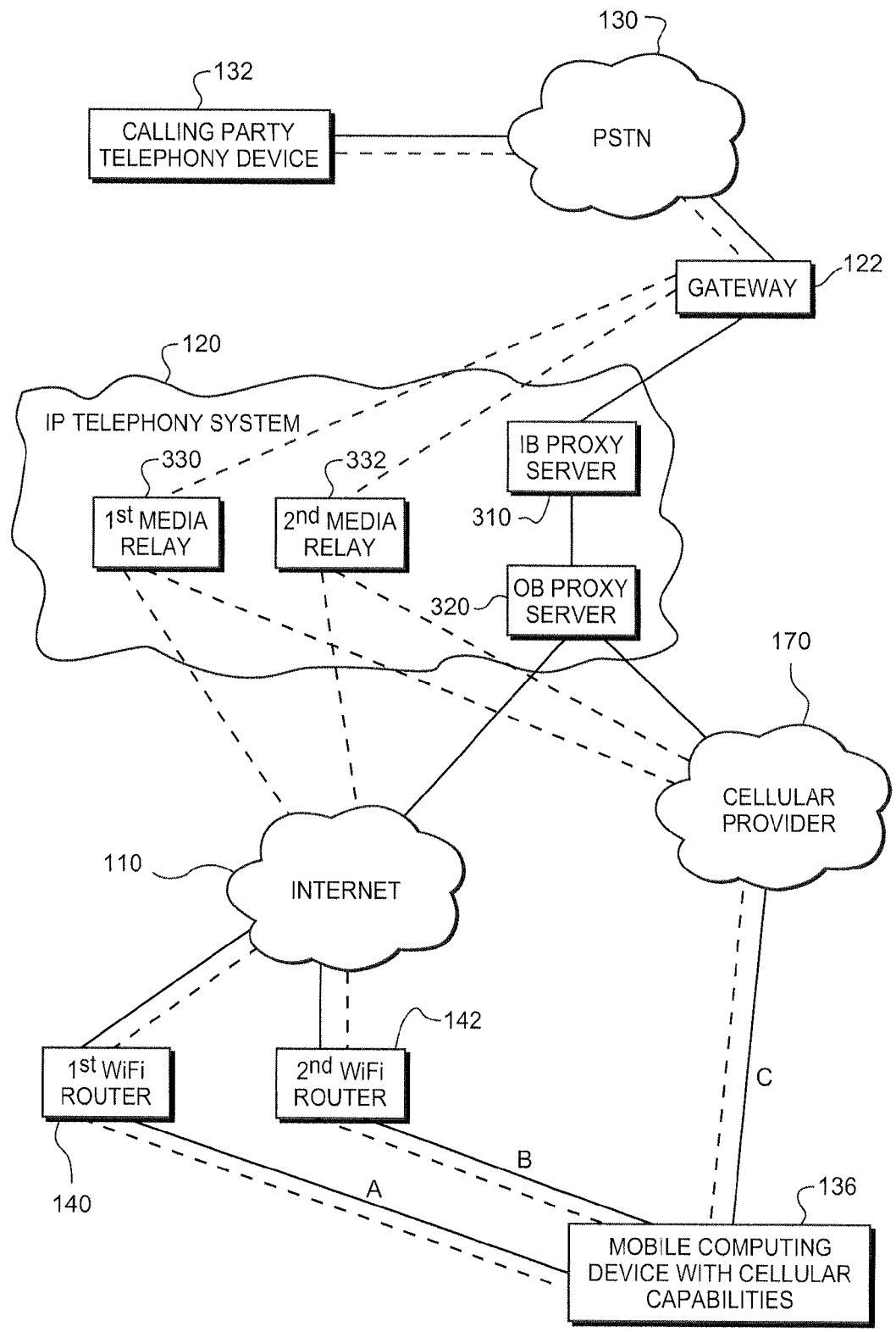
FIG. 3 is a block diagram illustrating the path that data packets bearing call setup signaling and the media of a VOIP telephone call traverse from a first telephone device to a second telephony device.

When a VOIP telephone call is to be established with a mobile telephony device, the mobile telephony device must first have a wireless data connection to a data network so that data packets can be communicated to and from the mobile telephony device to setup the call, and to carry the media of the call. FIG. 3 illustrates a mobile telephony device with cellular capabilities 136 that can establish a wireless data connection with a first wireless access point 140, a second wireless access point 142 or through a data channel provided by a cellular service provider 170. FIG. 3 also illustrates the different paths that data packets bearing call setup signaling and data packets bearing the media of a call may traverse over the various elements used to setup and carry a VOIP telephone call. In FIG. 3, solid lines indicate the paths traversed by data packets bearing call setup signaling, and dashed lines indicate the paths traversed by data packets bearing the media of a call.

The embodiment illustrated in FIG. 3 presumes that an analog telephone 132 will be used by a calling party to place a call to the mobile computing device 136. The calling party's analog telephone 132 is connected to a PSTN 130. The PSTN 130, in turn, is connected to a gateway 122, which allows the PSTN 130 to communicate with a IP telephony system 120. The IP telephony system 120 can communicate with the mobile computing device 136 via any one of multiple wireless data connections provided through the first wireless access point 140, the second wireless access point 142 and the cellular service provider 170.

When the calling party dials the telephone number of the mobile computing device 136 on his analog telephone 132, call setup signaling is communicated to the PSTN 130, and then from the PSTN 130 to the IP telephony system 120 via the gateway 122. The call setup signaling is received by an inbound proxy server 310 of the IP telephony system. The IP telephony system then checks to determine if the mobile computing device 136 is available via a wireless data connection, which would make it possible to setup a VOIP call to the mobile computing device 136.

Typically, if the mobile computing device 136 is configured to receive VOIP telephone calls from the IP telephony system 120, each time that the mobile computing device 136 establishes a wireless data connection, the mobile computing device 136 conducts a registration process with the IP telephony system 120. During the registration process, the IP telephony system 120 is informed of the IP address and port number at which the mobile computing device 136 can be reached. Thereafter, data is periodically communicated between the mobile computing device 136 and the IP telephony system 120 to keep this wireless data connection open.

In one embodiment of the invention, the mobile computing device 136 establishes a wireless data connection via path A through the first wireless access point 140 associated with a first location. Once that wireless data connection is established, the mobile telephony device 136 registers with the IP telephony system 120 via data communications passing over the first wireless access point 140. The data packets bearing those communications which are received by the IP telephony system 120 would be coming from the first wireless access point 140, and they would bear the IP address of the wireless access point, and possibly a port number that was assigned to the mobile telephony device. However, some type of network address translation scheme might also by used by the wireless access point. Regardless, the IP telephony system will be informed of the IP address and port number to which data packets must be addressed to ensure the data packets are ultimately delivered to the mobile computing device 136 via the first wireless access point 140. Thereafter, the IP telephony system 120 will address all data packets destined for the mobile computing device 136 to that address and port number. Also, the IP telephony system 120 will expect to receive data packets sent from the mobile computing device 136 to be sent from that same IP address and port number.

Continuing with the call setup explanation, when call signaling requesting the call is received by the inbound proxy server 310 of the IP telephony system 120, the IP telephony system checks to determine if the mobile computing device 136 is registered. If so, the IP telephony system knows how to reach the mobile computing device 136 to setup and carry the call. In this instance, an outbound proxy server 320 of the IP telephony system 120 sends data packets bearing call setup signaling to the first wireless access point 140, via the Internet 110, using the address information it acquired for the mobile computing device 136 when the mobile computing device registered with the IP telephony system 120. Those data packets are then delivered to the mobile computing device 136 by the first wireless access point 140.

In some instances, the path traversed by data packets that bear call setup signaling will be the same as the path traversed by data packets bearing the media of the call. However, in the following description a media relay of the IP telephony system 120 is used to convey data packets bearing the media of the call between the calling party and the called party's telephony device. As a result, the path traversed by data packets bearing the media of the call will be different from the path traversed by data packets bearing the call setup signaling.

During call setup, the IP telephony system 120 will select a media relay that will be used to help communicate data packets bearing the media of the call. In one embodiment of the invention, the IP telephony system 120 designates a first media relay 330. Of course in other instances, the second media relay 332 could be used instead. This information will be communicated to the mobile computing device 136 during call setup. As a result, once call setup is complete, the mobile computing device 136 will send data packets bearing the media of the call to the first media relay 330, and the first media relay will forward the data packets to the gateway 122 so that they can be delivered as audio to the calling party's telephony device 132 via the PSTN 130. Likewise, the first media relay 330 will send data packets bearing the media of the call to the mobile computing device 136 by addressing the data packets to the address established for the mobile computing device 136 when the mobile computing device registered with the IP telephony system 120. As described above, this will be an address associated with the first wireless access point 140.

Once the call commences, data packets bearing the media of the call will pass back and forth along a path that includes the gateway 122, the first media relay 330, and the first wireless access point 140. So long as the mobile computing device 136 maintains wireless data connection A through the first wireless access point 140, the call continues. However, if the mobile computing device moves from the first location to a second location that is too far away from the first wireless access point 140 to maintain wireless data connection A, wireless connection A is lost. However, the mobile computing device 136 is able to establish wireless data connection B with the second wireless access point 142 which is associated with the second location. The mobile computing device continues the telephone call established with the calling party's telephone 132 from the second location over the second wireless data connection B established with the second wireless access point 142.

As explained above, the first media relay 330 expects to receive data packets generated by the mobile computing device 136 and bearing media of the call from the address of the first wireless access point 140, as was established at the beginning of the call. If the mobile computing device 136 begins sending data packets bearing the media of the call to the first media relay 330 from the second wireless access point 142, which has a different address, and in the absence of further action, the first media relay 330 will not recognize the data packets as relating to the same telephone call. Because the data packets are originating from a new and unrecognized address, the data packets would be ignored. The subject invention provides a way to inform the first media relay 330 that the mobile computing device 136 has transitioned to a new wireless data connection. Methods embodying the invention provide the media relay with the new address to which the first media relay 330 should send data packets.

In methods embodying the invention, a certificate is established for the call during call setup. A copy of the certificate is temporarily stored on the mobile computing device 136 for the duration of the call. The certificate could be generated by the IP telephony system 120, or by the mobile computing device 136, or by some other element of the system. A copy of the certificate is also communicated to the first media relay 330. This could occur during call setup, or it could occur when the mobile computing device 136 begins to communicate media data packets to the first media relay 136. The certificate could be sent to the first media relay 330 from the mobile computing device 136, or from an element of the IP telephony system 120. Regardless, the first media relay 330 also stores a copy of the certificate for the duration of the call. Procedures for generating and verifying call certificates are well known to those of ordinary skill in the art. Also, in some embodiments, the call certificates may be encrypted before they are sent from one element to the next to prevent interception and unauthorized use of the network elements.

If the mobile computing device 136 transitions from a first wireless data connection to a second wireless data connection during the pendency of a call, the mobile computing device 136 sends the call certificate to the first media relay 330 via the second wireless data connection B as part of an initial contact made through the second wireless data connection B. This informs the first media relay 330 that the mobile computing device has transitioned to the second wireless data connection B passing through the second wireless access point 142, and that the call can continue over this new wireless data connection. This communication also provides the first media relay 330 with the address to which data packets bearing the media of the call should be sent so that the data packets can reach the mobile computing device 136 through the second wireless data connection B. The new address will be an address associated with the second wireless access point 142. After the first media relay 330 has this information, the first media relay 330 will know to send data packets to the new address, and also to accept data packets sent by the mobile computing device 136 which appear to originate from the new address associated with the second wireless access point 142. Thus, the call can continue over the second wireless data connection B.

The same type of transition could occur if the mobile computing device switches from the second wireless data connection B established through the second wireless access point 142 to a third wireless data connection C which is established over a data channel provided by the cellular service provider 170. The same basic process would occur to inform the first media relay 330 of the change. Likewise, the same procedures would be followed if the mobile computing device transitions from a wireless data connection established via a data channel provided by a cellular service provider to a new wireless data connection established through a wireless router.

Figure 4:
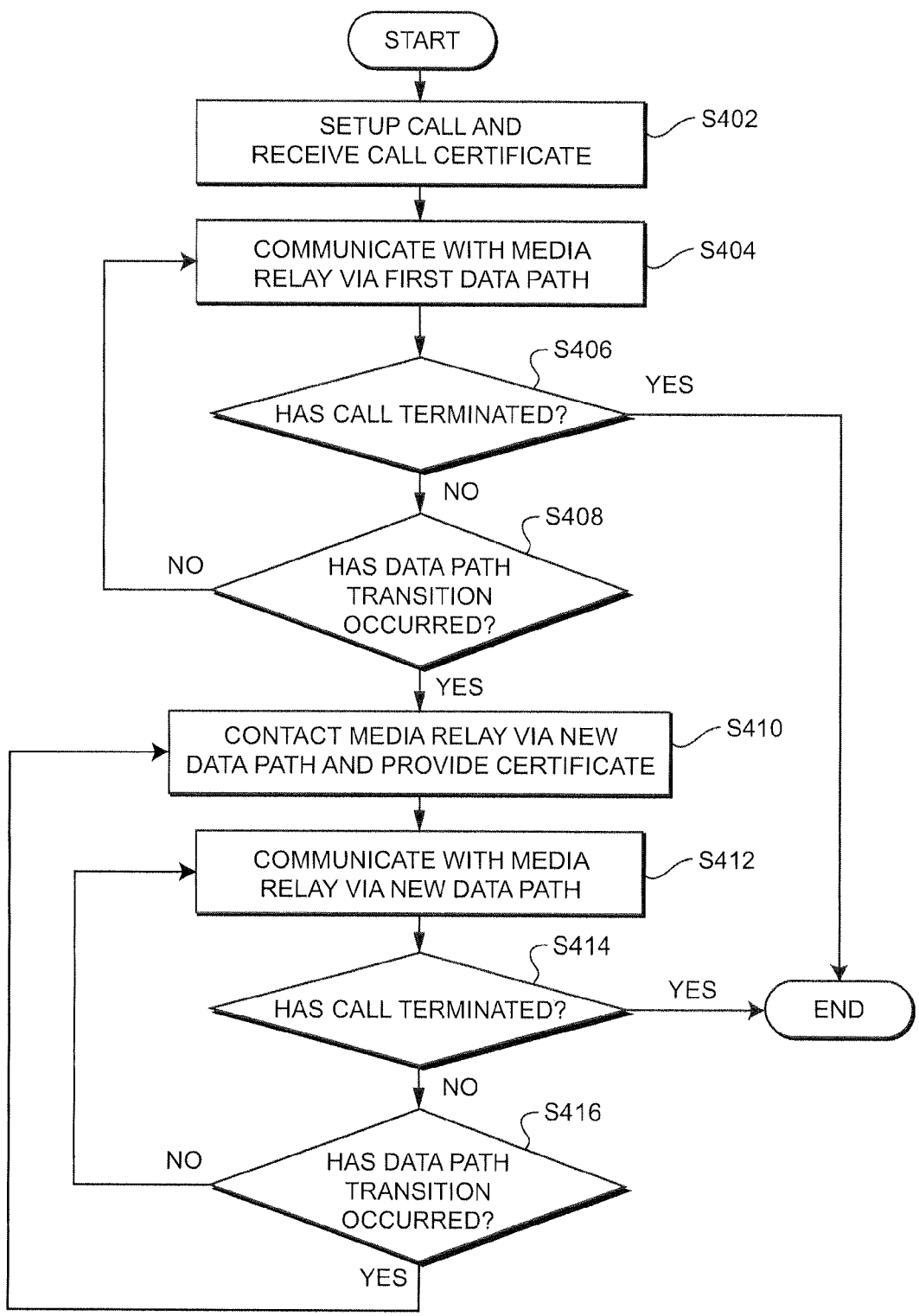
FIG. 4 is a flowchart of steps of a first method embodying the invention that would be performed by a mobile telephony device to accomplish a transition from a first wireless data connection to a second wireless data connection during a VOIP telephone call.

FIG. 4 illustrates steps of a method embodying the invention which allows a mobile computing device 136 to transition from a first wireless data connection to a second wireless data connection. The method begins in step S402 when the mobile computing device 136 conducts call setup signaling with an outbound proxy server 320 of the IP telephony system 120. This signaling reaches the mobile computing device 136 via a wireless data connection the mobile computing device 136 has established, as discussed earlier. For purposes of explanation, the mobile computing device 136 has established wireless data connection B through the second wireless access point 142, as shown in FIG. 3. During this initial call setup signaling, the mobile computing device 136 receives a certificate for the call. Also, a media relay for the call would be identified. In this embodiment, the second media relay 332 has been selected for the call.

In step S404, the mobile computing device 136 begins to communicate data packets bearing the media of the call with the second media relay 332 via wireless data path B, through the second wireless access point 142. In step S406, a check is performed to determine if the call has been terminated. If so, the call ends. If not, a check is performed in step S408 to determine if the mobile computing device has transitioned to a new wireless data connection. If not, the method loops back to step S404, and communications continue with the second media relay 332 over wireless data connection B through the second wireless access point 142.

If, during one of the checks performed in step S408, the mobile computing device determines that a transition to a new wireless data connection has occurred, the method proceeds to step S410, where the mobile computing device 136 contacts the second media relay 332 over the wireless data connection, such as wireless data connection C, and sends the second media relay 332 a copy of the certificate for the call. This informs the second media relay 332 of the occurrence of the transition, it informs the second media relay 332 that this is a continuation of the original call, and that the second media relay should now send data packets to a new address and port number associated with the cellular service provider 170. This also informs the second media relay 332 to expect data packets transmitted from the mobile computing device 136 to have the new address and port number associated with the cellular service provider 170.

In step S412, the mobile computing device 136 communicates data packets with the second media relay 332 over wireless data connection C, which passes over the cellular service provider 170. Next, in step S414 a check is performed to determine if either party has terminated the call. If so, the call ends. If not, a check is performed in step S416 to determine if another transition to another wireless data connection has occurred. If not, the call proceeds as the mobile computing device 136 continues to communicate with the second media relay 332 over wireless data connection C. If another transition has occurred, the method proceeds to step S410, where the mobile computing device 136 once again goes through the process of informing the second media relay 332 of the transition to a new wireless data connection.

In some instances, the transition from a first wireless data connection to a second wireless data connection will consume enough time that the parties to the call might notice a break in communications. This could occur because of the time required for the mobile computing device to terminate the first wireless data connection and establish the second wireless data connection. This could also be due to the time required to accomplish the signaling with the media relay to inform the media relay of the change.

To help minimize or eliminate any interruption in the call that might be noticed by the parties to the call, it is possible for the mobile computing device to create a buffer of audio data for the call. The buffer would store a few seconds worth of audio that could be played to the user of the mobile computing device during the transition. Likewise, the media relay involved in the call could buffer a few seconds of audio that could be played to the calling party's telephone 132 during the transition. The buffer(s) containing audio data could be built up over time as the call proceeds.

In other embodiments, a message may be played to the parties to the call during a transition to inform them to hold for a few moments. This would give the system time to complete the transition from a first wireless data connection to a second wireless data connection. A second message might also be played to the parties once the transition is complete and the call can resume.

The mobile computing device 136 could determine that there is a need for a call buffer to cover a wireless data connection transition by monitoring the quality of the existing wireless data connection. For example, the mobile computing device 136 could monitor the signal strength of the connection to a wireless router or to a cell tower. The mobile computing device 136 might also monitor data packet transmission statistics to determine the strength or quality of the wireless data connection.

If the quality of the wireless data connection is already low, the mobile computing device would determine that an audio buffer is desirable. Likewise, if the quality is steadily declining over time, the decline could indicate that the mobile computing device is moving away from the wireless router or cell tower to which it is connected, indicating that a transition may be imminent. In these cases, the mobile computing device 136 establishes an audio buffer if one did not already exist. The mobile computing device 136 might also act to increase the size of an existing buffer to help cover an interruption that would occur during a transition to a new wireless data connection.

The media relay handling the call will not have a way of independently measuring the quality of the data connection being provided by the existing wireless data connection established for the mobile computing device 136. However, if the mobile computing device 136 determines that the quality of its wireless data connection is poor, or is steadily declining, the mobile computing device 136 could inform the media relay of this fact so that the media relay could also establish an audio buffer and/or increase the size of an existing audio buffer to prepare for a transition to a new wireless data connection.

Figure 5:
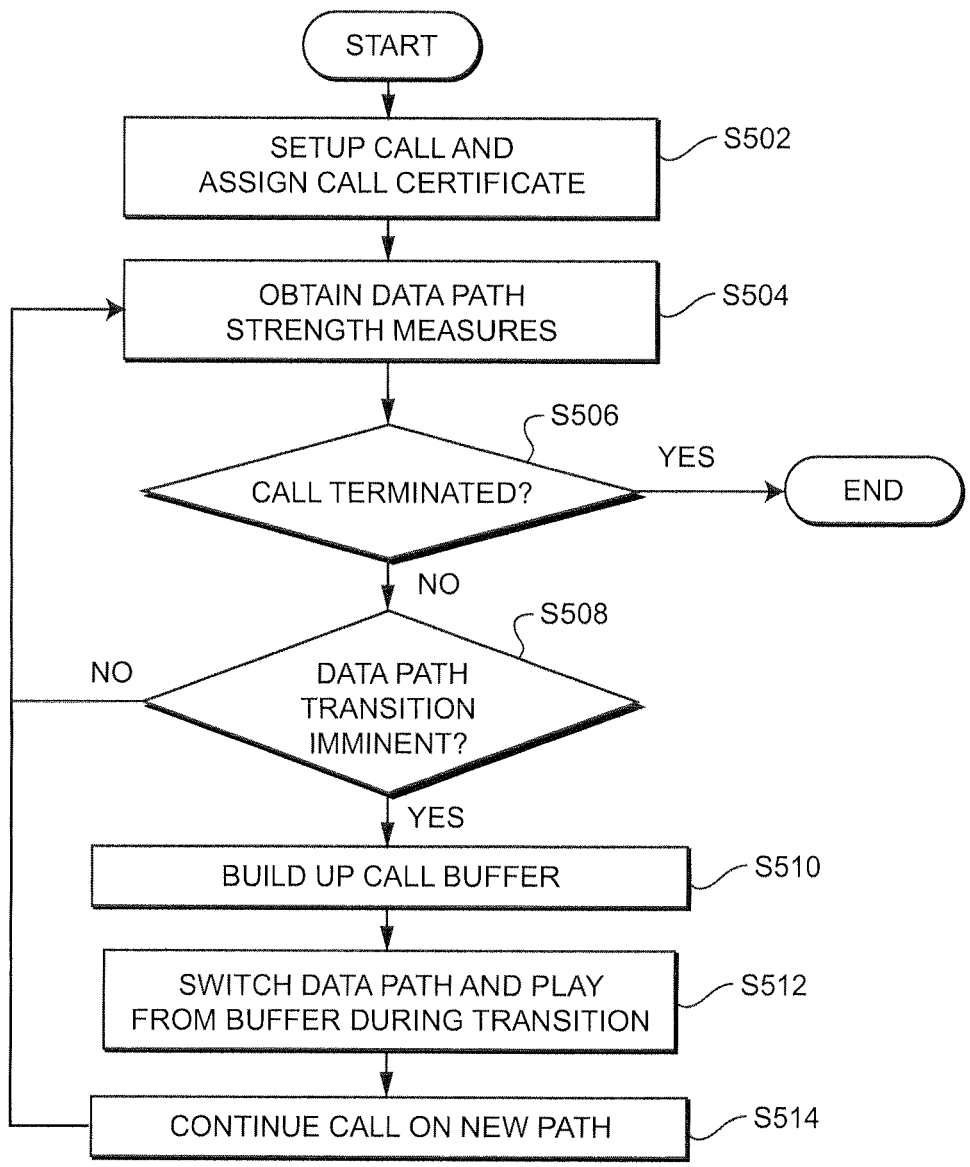
FIG. 5 is a flowchart of a second method embodying the invention that would be performed by a mobile telephony device to accomplish a transition from a first wireless data connection to a second wireless data connection during a VOIP telephone call.

FIG. 5 illustrates steps of another method embodying the invention where an audio buffer for a call is created or increased in size because the mobile computing device has determined that a transition to a new wireless data connection may be imminent. The method begins in step S502, where a mobile computing device 136 conducts call setup signaling and receives a certificate for the call. The mobile computing device 136 then begins to communicate data packets bearing the media of the call with a media relay over a first wireless data connection.

In step S504, the mobile computing device 136 monitors the quality of the first wireless data connection. This can include conducting any of the quality measures of the wireless data connection discussed above, as well as any other measures that are indicative of the strength or quality of the wireless data connection.

In step S506, a check is performed to determine if one of the parties to the call has terminated the call. If so, the call ends. If not, the method proceeds to step S508 where the mobile computing device determines if a transition to a new wireless data connection appears imminent. This judgment could be made if the quality of the wireless data connection is low, or if the quality appears to be steadily declining, indicating that the mobile computing device is moving away from the device offering the wireless data connection.

If it appears that a transition to a new wireless data connection is not imminent, the method loops back to step S504, and the call continues. If it appears that a transition to a new wireless data connection is imminent, the method proceeds to step S510, where a new audio buffer is established, or where an existing audio buffer is made larger. Also, audio data is loaded into the buffer to fill the buffer, as much as is possible. Step S510 could also include the mobile computing device contacting the media relay to inform the media relay that a transition is imminent so that the media relay can create or enlarge and fill a similar buffer at its end.

In step S512, a transition from the first wireless data connection to a second wireless data connection would occur, according to the procedures explained above. During that transition, audio data from the buffer would be played to the user of the mobile computing device 136. Also, the media relay may play audio data from its buffer to the other party to the call. Then, in step S514, the mobile computing device would begin to communicate data packets bearing the media of the call with the media relay over the second wireless data connection. The method then loops back to step S504.

Another strategy for dealing with a mobile computing device that is moving into and out of range of multiple wireless data connection points is to have the mobile computing device 136 establish multiple wireless data connections to multiple wireless routers, or to one or more cell towers that can provide a data channel via cellular service. The mobile computing device monitors the quality provided by each of the wireless data connections, and the mobile computing device utilizes the wireless data connection having the highest quality to communicate the data packets bearing the media of a call.

The mobile computing device would begin to communicate with the media relay over a first wireless data connection that offers the highest quality. If the first wireless data connection declines in quality to the point where a second wireless data connection offers better quality, the mobile computing device then begins to communicate with the media relay over the second wireless data connection. The procedures explained above would be used to inform the media relay when a transition occurs.

If, during a call, the mobile computing device moves to within range of a new device offering a new wireless data connection, the mobile computing device will go ahead and establish a new wireless data connection with the new device, even through the call may continue to run through one of the existing wireless data connections. The point is for the mobile computing device to maintain multiple wireless data connections simultaneously so that the media bearing the audio of a call can be transmitted through whichever wireless data connection offers the best quality at any given moment. And the call can be transitioned from one wireless data connection to another via the procedures explained above.

Figure 6:
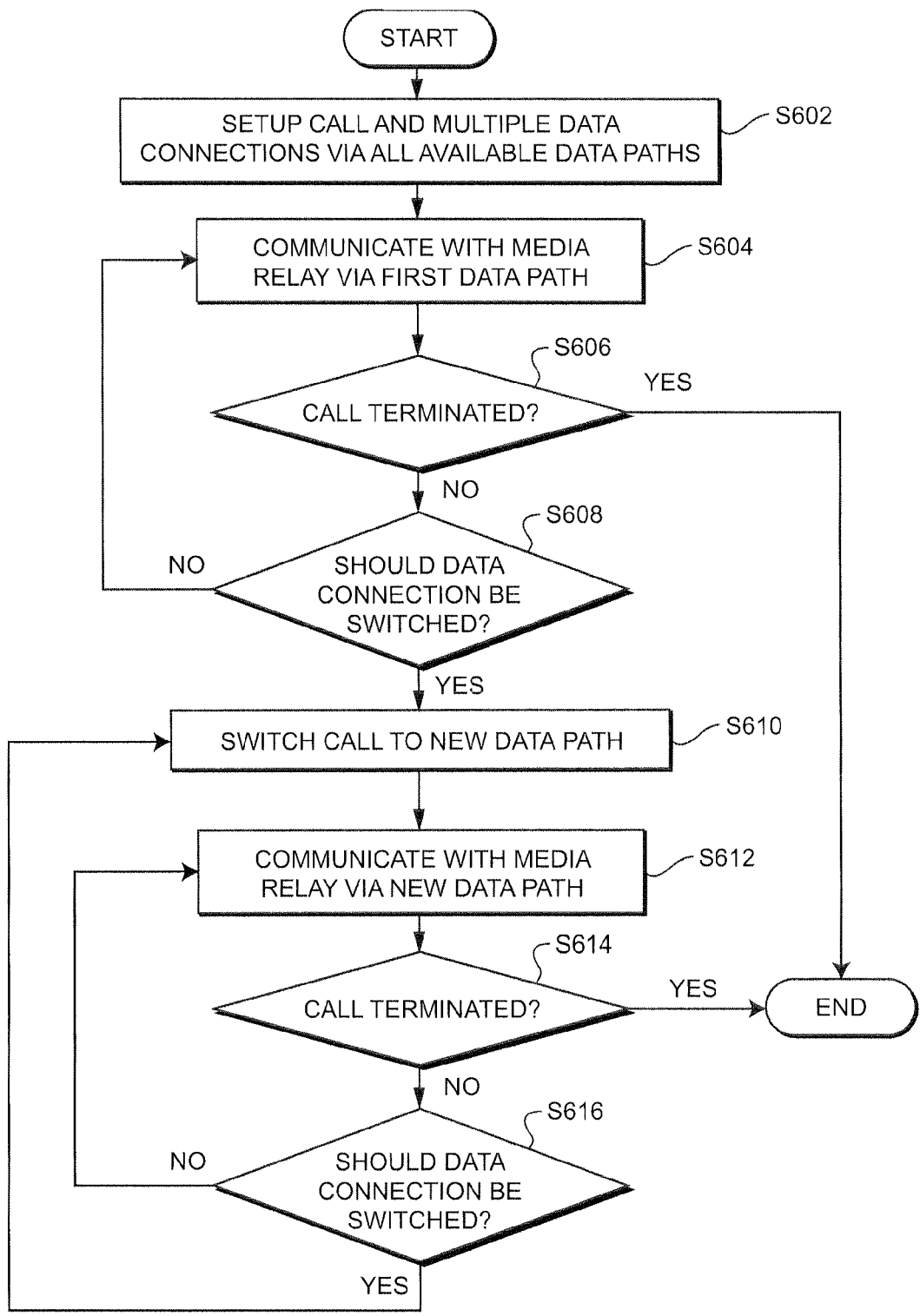
FIG. 6 is a flowchart of a third method embodying the invention in which multiple wireless data connections are established by a mobile telephony device and where the media of a VOIP telephone call is switched between the wireless data connections during the duration of the call.

A method embodying the invention that includes maintaining multiple wireless data connections simultaneously is illustrated in FIG. 6. The method begins in step S602 where a new call is setup with a mobile computing device. The mobile computing device also sets up wireless data connections with any devices that offer such a connection.

In step S604, the mobile computing device communicates data packets bearing the media of a call with a media relay over a first wireless data connection that offers the best quality among all available wireless data connections. The method proceeds to step S606 where a check is performed to determine if either party to the call has terminated the call.

If so, the call ends. If not, the method proceeds to step S608 where a check is made to determine if the mobile computing device should switch from the first wireless data connection to an alternate wireless data connection. This could involve monitoring the quality provided by all available wireless data connections, and determining if one of the unused wireless data connections offers significantly better quality than the wireless data connection currently in use. If not, the method loops back to step S604. If so, the method proceeds to step S610.

In step S610, the mobile computing device switches the call from the first wireless data connection to a new wireless data connection that offers better quality. The transition is handled using the methods discussed above. Then, in step S612, the mobile computing device begins communicating data packets bearing the media of a call with the media relay over the new wireless data connection.

In step S614 a check is performed to determine if either party has terminated the call. If so, the call ends. If not, the method proceeds to step S616 where another check is performed to determine if the call should be switched to a new wireless data connection. If not, the method loops back to step S612. If so, the method loops lack to step S610 so that the transition can be accomplished.

Although the methods described immediately above involve keeping multiple wireless data connections open simultaneously, the idle wireless data connections that are not being used to communicate the media of the call will use up very little bandwidth. Thus, maintaining multiple simultaneous wireless data connection will not consume a great deal of system capacity.

In the examples discussed above, when the call quality provided by a first wireless data connection deteriorates, the call is switched to a second wireless data connection. In alternate embodiments, when a second wireless data connection is established between the telephony device and the media relay, data packets bearing the audio of the call could be communicated between the telephony device and the media relay in parallel via both the first and second wireless data connections. In this instance, if it becomes necessary to switch between the first and second wireless data connections, the media relay could simply stop using the data packets being provided via the first wireless data connection and begin using the data packets provided via the second wireless data connection. This could result in a faster transition between the first and second wireless data connections.

If two simultaneous wireless data connections are established between a telephony device and a media relay, more data traffic must be carried by the network. The parallel streams of data packets traversing the first and second wireless data connections basically duplicate one another. For this reason, and to minimize the data traffic, the second wireless data connection and the parallel streaming of data packets may only be initiated when the quality offered by the first wireless data connection begins to deteriorate.

In the foregoing examples, the quality offered by a wireless data connection is monitored. In some embodiments, this could comprise measuring and/or monitoring data packet transmission statistics. In alternate embodiments, this could comprise measuring and/or monitoring the voice or audio quality using methods that are well known to those of ordinary skill in the art.

All of the foregoing examples referred to a call. The call could be an audio call or a video call. Thus, any references to an audio buffer would apply equally to a buffer used hold video data.

Also, although the examples provided above referred to a mobile computing device, any type of mobile telephony device could be used in the methods.

Figure 7:
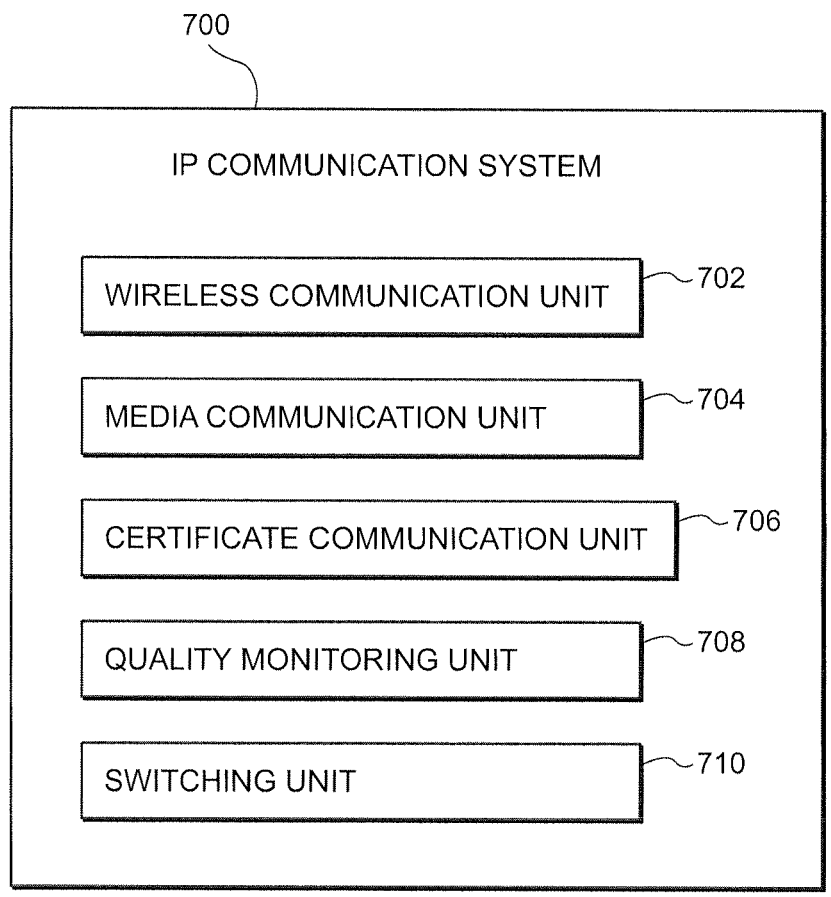
FIG. 7 is a block diagram illustrating elements of an IP communication system embodying the invention.

FIG. 7 illustrates elements of an IP communication system 700 embodying the invention and capable of performing the methods discussed above. The IP communication system 700 includes a wireless communication unit 702 that establishes a wireless data connection to a data network. In some embodiments, the wireless communication unit is capable of establishing and simultaneously maintaining multiple wireless data connections with the data network.

The IP communication system 700 also includes a media communication unit 704 that communicates with a media relay over a wireless data connection to exchange data packets bearing the media of a VOIP telephone call, or some other type of IP communication. Also, a certificate communication unit 706 sends a certificate identifying a VOIP telephone call to the media relay whenever a transition is made between first and second wireless data connections.

In some embodiments, the IP communication system 700 also includes a quality monitoring unit 708 that monitors a quality of a wireless data connection. The IP communication system 700 may also include a switching unit 710 that performs the functions needed to switch the media communication unit 704 from a first wireless data connection to a second wireless data connection so that data packets bearing the media of a VOIP call are communicated with the media relay over the second wireless data connection. This could occur if a quality of the first wireless data connection falls below a threshold quality measure.

A software application installed and running on mobile telephony device may configure the mobile telephony device to include some or all of the elements illustrated in FIG. 7. In alternate embodiments, a computer running a software application could configure the computer to include some or all of the elements illustrated in FIG. 7. In still other embodiments, other types of IP telephony devices could be configured to include some or all of the elements illustrated in FIG. 7.

Figure 8:
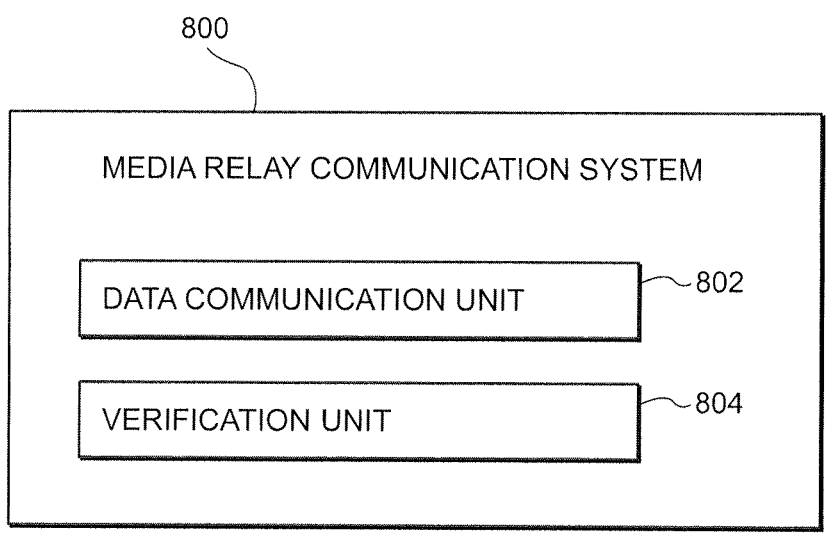
FIG. 8 is a block diagram illustrating elements of a media relay communication system embodying the invention.

FIG. 8 illustrates elements of a media relay communication system 800 embodying the invention that is capable of performing methods embodying the invention. The media relay communication system 800 includes a data communications unit 802 that exchanges data packets bearing the media of a VOIP telephone call with a mobile telephony device via one or more wireless data connections to the mobile telephony device. The media relay communication system also includes a verification unit 804 that receives a certificate for a particular call during initial call setup. The certificate could be received from a proxy server, from a telephony device that will participate in the call, or from some other elements of the IP telephony system. The verification unit also receives verification communications sent from a mobile telephony device when the mobile telephony device switches from a first wireless data connection to a second wireless data connection. The verification communication is sent over the new wireless data connection, and the verification communication includes a copy of the certificate identifying the VOIP telephone call. The verification unit 804 compares the originally received certificate to the certificate received from the mobile telephony device over the new wireless data connection. If the certificates match, the data communication unit 802 exchanges data packets bearing the media of the VOIP telephone call with the mobile telephony device via the second wireless data connection.

A media relay could include software that configures the media relay to include some of all of the elements illustrated in FIG. 8. In alternate embodiments, some features may be present on one physical device, whereas other features may be present on another physical device, with the elements operating together to provide all the elements illustrated in FIG. 8.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of conducting a voice over Internet protocol (VOIP) telephone call, comprising:
    establishing a first wireless data connection with a data network;
    communicating with a media relay over the first wireless data connection to exchange data packets bearing the media of a VOIP telephone call;
    establishing a second wireless data connection to the data network;
    sending a certificate identifying the VOIP telephone call to the media relay via the second wireless data connection; and
    communicating with the media relay over the second wireless data connection to exchange data packets bearing the media of the VOIP telephone call.

2. The method of claim 1, wherein the steps are performed by a mobile telephony device.

3. The method of claim 2, further comprising receiving and temporarily storing the certificate identifying the VOIP telephone call on the mobile telephony device.

4. The method of claim 1, further comprising:
    monitoring a quality of the first wireless data connection after it has been established; and
    comparing the quality of the first wireless data connection to a threshold quality measure, wherein the step of establishing a second wireless data connection to the data network is performed when the quality of the first wireless data connection falls below the threshold quality measure.

5. The method of claim 1, further comprising:
    monitoring a quality of the first wireless data connection after it has been established; and
    increasing a size of a buffer for the media of the VOIP telephone call if the quality of the first wireless data connection is decreasing toward a threshold quality measure.

6. The method of claim 5, wherein the step of establishing a second wireless data connection to the data network is performed when the quality of the first wireless data connection falls below the threshold quality measure, and wherein the media of the VOIP telephone call stored in the buffer is played during the transition from the first wireless data connection to the second wireless data connection.

7. The method of claim 1, wherein a message is played to the user of the mobile telephony device during a transition from the first wireless data connection to the second wireless data connection.

8. A system for conducting a voice over Internet protocol (VOIP) telephone call, comprising:
- means for establishing a first wireless data connection with a data network;
- means for communicating with a media relay over the first wireless data connection to exchange data packets bearing the media of a VOIP telephone call;
- means for establishing a second wireless data connection to the data network;
- means for sending a certificate identifying the VOIP telephone call to the media relay via the second wireless data connection; and
- means for communicating with the media relay over the second wireless data connection to exchange data packets bearing the media of the VOIP telephone call.

9. A system for conducting a voice over Internet protocol (VOIP) telephone call, comprising:
- a wireless communication unit that establishes first and second wireless data connections with a data network through first and second wireless access points, respectively;
- a media communication unit that communicates with a media relay over the first and second wireless data connections to exchange data packets bearing the media of a VOIP telephone call; and
- a certificate communication unit that sends a certificate identifying the VOIP telephone call to the media relay whenever a transition is made between the first and second wireless data connections.

10. The system of claim 9, wherein the certificate communication unit receives and temporarily stores the certificate identifying the VOIP telephone call.

11. The system of claim 9, further comprising a monitoring unit that monitors a quality of the first wireless data connection after it has been established and that compares the quality of the first wireless data connection to a threshold quality measure, wherein the wireless communication unit establishes the second wireless data connection to the data network when the quality of the first wireless data connection falls below the threshold quality measure.

12. The system of claim 9, further comprising a monitoring unit that monitors a quality of the first wireless data connection after it has been established, and wherein the wireless communication unit increases a size of a buffer for the media of the VOIP telephone call if the quality of the first wireless data connection is decreasing toward a threshold quality measure.

13. The system of claim 12, wherein the wireless communication unit establishes the second wireless data connection to the data network when the quality of the first wireless data connection falls below the threshold quality measure, and wherein the wireless communication unit plays media of the VOIP telephone call stored in the buffer during the transition from the first wireless data connection to the second wireless data connection.

* * * * *